Sept. 7, 1954 H. W. HURD ET AL 2,688,394
BELT CONVEYER FOR LOOSE AGGREGATES
Filed June 18, 1951 9 Sheets-Sheet 4

INVENTORS
Harry W. Hurd
Francis H. James
BY
Greth Wells
Atty.

Sept. 7, 1954      H. W. HURD ET AL      2,688,394

BELT CONVEYER FOR LOOSE AGGREGATES

Filed June 18, 1951      9 Sheets-Sheet 5

INVENTORS
Harry W. Hurd
Francis H. James
BY
Erich Wells
Atty.

Sept. 7, 1954   H. W. HURD ET AL   2,688,394
BELT CONVEYER FOR LOOSE AGGREGATES
Filed June 18, 1951   9 Sheets-Sheet 6

INVENTORS
Harry W. Hurd
Francis H. James
BY
Atty.

Sept. 7, 1954   H. W. HURD ET AL   2,688,394
BELT CONVEYER FOR LOOSE AGGREGATES
Filed June 18, 1951   9 Sheets-Sheet 8

INVENTORS
Harry W. Hurd
Francis H. James
BY
Atty.

Sept. 7, 1954   H. W. HURD ET AL   2,688,394
BELT CONVEYER FOR LOOSE AGGREGATES
Filed June 18, 1951   9 Sheets-Sheet 9

INVENTORS
Harry W. Hurd
Francis H. James
BY
Struhlwells
Atty.

Patented Sept. 7, 1954

2,688,394

UNITED STATES PATENT OFFICE 2,688,394

BELT CONVEYER FOR LOOSE AGGREGATES

Harry W. Hurd and Francis H. James, Boise, Idaho, assignors to Hurd and James, Inc., Boise, Idaho Application June 18, 1951, Serial No. 232,104

8 Claims. (Cl. 198—184)

The present invention relates to improvements in a belt conveyor for loose aggregates such as coal, sand, gravel, cinders, grains and the like.

Conveyors of this character are generally characterized by the fact that they must have a long self-supporting frame which extends horizontally and upwardly from a lower end to an upper end at some distance. The optimum strength per unit of weight is desired since the elongated frame must generally carry its own weight, plus the weight of the belt, plus the weight of the material being moved. The conveyors are often portable and so constructed that they may be operated at different angles to the horizontal as the occasion requires. These conveyors are most generally operated in areas exposed to the atmosphere with no cover or protection of any sort. They are subjected to all sorts of weather conditions and the material which they must move is of such nature as to create dust and falling particles.

The primary object of the present invention is to provide in a single frame of sheet metal a supporting beam for the belt and load which mounts troughing rollers for the upper flight of the belt and which encloses and carries the lower flight of the belt, protecting it from falling loose material and the elements. The belts commonly used for conveying loose materials are largely constructed of rubber and like material which deteriorates more rapidly when exposed to direct sun and out door variations in weather. With the present invention this exposure is cut in half by the same beam construction that supports the load. The same beam construction also keeps loose and falling materials away from the inner face of the belt and keeps loose material from piling up on the beam to add further weight to the construction.

A further object of the invention is to provide a single frame support for the belt in combination with troughing rollers to maintain the belt trough-shaped in cross section so that accumulations of solids on the conveyor are substantially avoided and increased air circulation is provided transversely of the belt and frame to keep the temperature down and to reduce resistance to cross winds.

Another detailed object of this invention is the provision of a frame and roller construction assembly having novel means by which a plurality of duplicate sections or lengths may be joined together to provide the desired over all length of conveyor.

It is also an object of the invention to provide a supporting frame with novel head end and tail end assemblies of such nature as to permit mounting and removing of an endless belt on the assembled conveyor frame without cutting the belt and without disconnecting the frame. The invention contemplates the provision in the assembled conveyor of a novel supporting means for the end pulleys of the belt so that a wide latitude in length adjustment is permissible. The head and tail end assemblies are of such a nature that it is a simple matter to supply the motive power to either end.

It is also a purpose of this invention to provide means whereby the belt is troughed both on its load carrying flight and on its return flight, the troughing on the return flight being a reversal of the bending of the belt in order to train the return flight so as to prevent movement sidewise and at the same time to give the belt opportunity to correct itself from the troughing stresses on the loaded flight.

Another and more detailed object of this invention is to provide means for troughing the upper flight of the conveyor belt which means operates to vibrate the belt in such a fashion as to bring the material toward the center of the belt and for certain types of material, to keep the material bouncing on the belt at all times. The troughing construction is shown and described hereinafter with several modifications in details, the objects of these modified details being to improve the operation under certain conditions as will be more fully explained in the detailed description.

Other objects and advantages of the invention will appear from the following detailed description and the accompanying drawings wherein a preferred embodiment of the invention is shown. It should be understood however, that the drawings and description are illustrative only and are not intended to limit the invention except insofar as it is limited by the claims.

Figure 1:
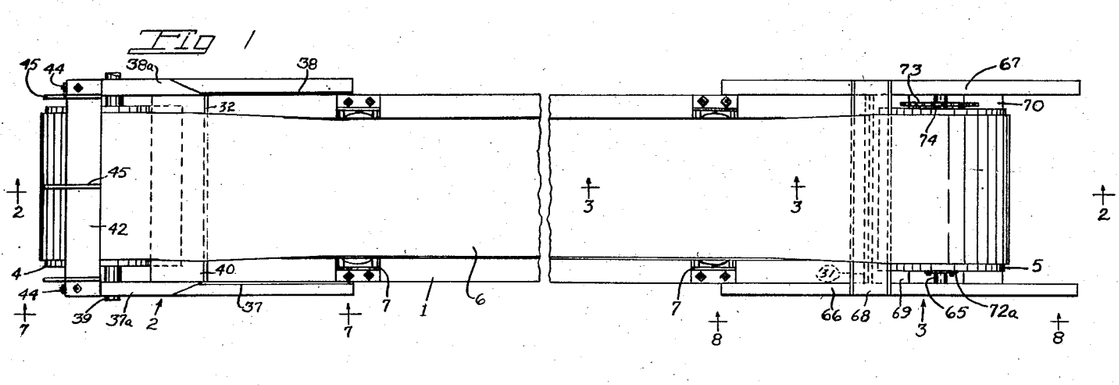
Figure 1 is a somewhat diagrammatic plan view of a conveyor for loose aggregates embodying our invention.
Figure 2:
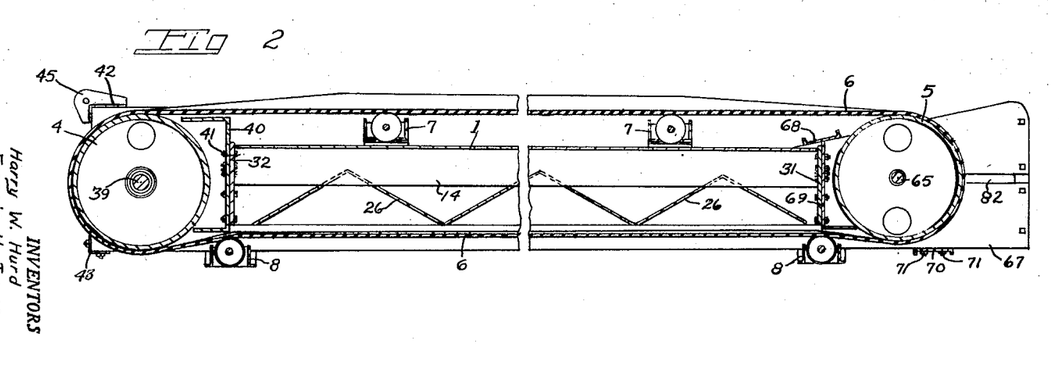
Figure 2 is a longitudinal sectional view taken on the line 2—2 of Figure 1.

Referring now in detail to the drawings, the invention is embodied in a belt conveyor that is particularly adapted for use in handling loose material such as sand, gravel, coal, ore, clinkers, grain, concrete and commodities that flow or may fall over the side edges of the loaded belts. When the loose material falls over the side of the troughed belts, it may do serious damage to the belt if it finds its way to the return or lower flight of the belt. Any exterior framework or parts that will catch dust or loose material serve to multiply the difficulties of protecting the belt. In long flights of conveyors the problem of cross winds deflecting the unloaded lower flight of the belt must also be considered. The conveyor constructed in accordance with our invention embodies a sheet metal frame 1 which is also constructed as to be completely self supporting and capable of supporting the loaded belt with the pulleys and troughing rollers that are necessary for the belt operation. This supporting frame 1 is combined with a head frame unit 2 and a tail frame unit 3 which mounts two pulleys 4 and 5 for an endless belt 6. Troughing roller assemblies 7 are mounted on the frame 1 to support the upper flight of the belt 6 which carries the load. The lower flight of the belt 6 is carried by roller assemblies 8. As shown in Figures 1 and 2 only the end portions of the frame 1 are included with the head and tail units 2 and 3. It will be appreciated that the length of the frame 1 will vary depending upon the desired length of conveyor needed and as many of the roller assemblies 7 and 8 will be used as are necessary to support the belt 6 throughout the length of the conveyor.

Referring now to Figures 3 to 6 inclusive the detailed construction of the frame 1 will be described. In its preferred form this frame comprises two main sheet metal strips 10 and 11 of suitable thickness and length. These strips are bent along the line parallel to one edge as indicated at 12 and 13. The angular bend at 12 and 13 is about 105 to 120 degrees. The two flanges 14 and 15 formed by this bend are placed against each other as shown clearly in Figures 5 and 6 and are welded together to form a longitudinal rib. The top portions 16 and 17 of the metal strips 10 and 11 will slope downwardly and outwardly from the rib formed by the flanges 14 and 15. The strips are bent again at 18 and 19 to form side portions 20 and 21 which extend downwardly substantially parallel to each other. Along the lower edges of the side portions 20 and 21 the strips are bent inwardly to provide horizontal flanges 22 and 23. Thus the two main strips 10 and 11, when bent as indicated, provide an inverted trough shaped beam or frame which has a stiffening rib centrally thereof extending downwardly from the topmost part of the frame. The top portions 16 and 17 form a roof that slopes about 15 to 30 degrees to the horizontal from the center of the frame to the outer side edges.

The frame 1 is completed by providing diagonally extending strips 24 and 25 that extend upwardly and outwardly from the center edges of the flanges 22 and 23 to join the side wall portions 20 and 21. The strips 24 and 25 have their edges affixed to the main strips in any suitable manner such as by welding. A truss plate 26 extends in zig zag fashion lengthwise of the frame 1 between the side portions 20 and 21 above the upper edges of the strips 24 and 25. The truss plate 26 is affixed to the side portions 20 and 21 by welding. It will be noted that the uppermost portions of the truss plate 26 overlap with the central rib formed by the flanges 14 and 15. The truss plate 26 is notched to receive the rib and the rib and truss plate are welded together where they meet.

The troughing roller assemblies 7 are mounted on the top portions 16 and 17. The roller assemblies 8 have mounting portions 27 and 28 which are mounted to the flanges 22 and 23 by bolts 29 and 30. The upper flight of the belt 6 is thus supported above the V-shaped portions of the frame 1 so that any material falling from the top flight of the belt will strike the sloping portions 16 and 17 and fall off the sides of the frame. Likewise an air passage crosswise of the conveyor is provided between the belt 6 and the frame 1. This air passage is narrowest directly over the center of the frame and expands outwardly to the outer edges of the belt. Air can flow readily between the belt and the frame and this keeps down the accumulation of dust. It also reduces resistance to cross winds.

Figure 3:
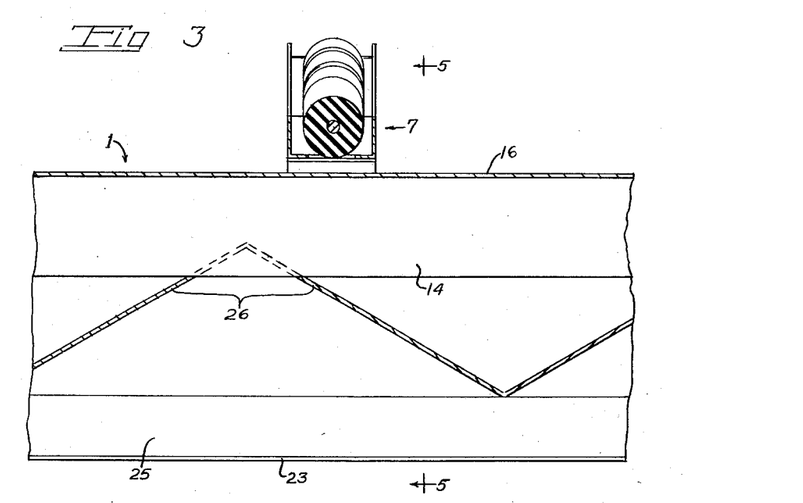
Figure 3 is an enlarged sectional view taken on the line 3—3 of Figure 1.
Figure 5:
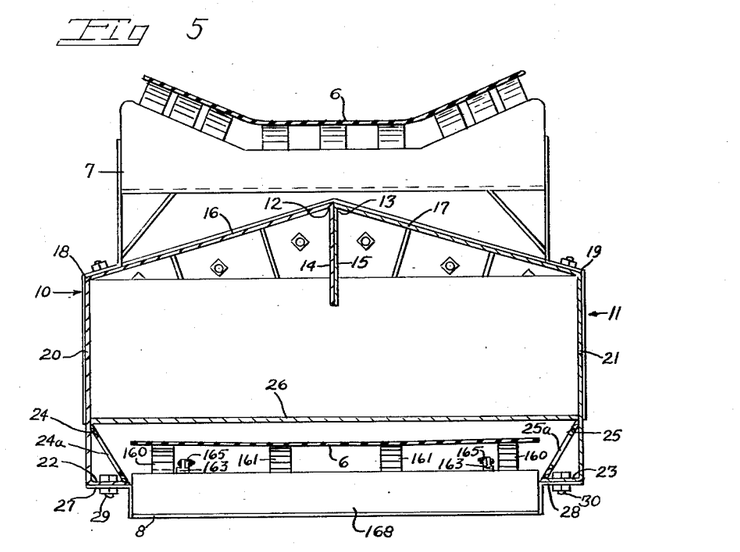
Figure 5 is a sectional view taken on the line 5—5 of Figure 3.

The lower roller assembly 8 holds the lower flight of the belt 6 well above the flanges 22 and 23 so that the entire lower flight of the belt 6 is enclosed on the top and sides. It will be appreciated that there is practically no opportunity for loose material to get on top of the lower flight of the belt 6. Furthermore the lower flight of the belt is protected from sun, rain and snow, which means that in the ordinary use of the device there is about one-half of the belt always protected. This is particularly advantageous in prolonging the life of the belt made of rubber materials which age much more rapidly in bright sunlight than they do when protected.

The frame I preferably is made up in unit length sections that are joined together to provide a belt supporting frame of the desired length. It is preferred to provide the sections in eight foot lengths with means to join the several sections so that they may be used as a single beam of the desired length. The means for joining the sections is illustrated best by Figures 4 and 6. Each section is closed at both ends above the strips 24 and 25 by end plates 31 and 32. These plates are slightly larger than the outline of the side portions 20 and 21 and the top portions 16 and 17, in order that they may be welded firmly to the ends of these portions. Gusset plates 33 and 34 are welded to the end plates 31 and 32 and to the corresponding side portions and top portions of the frame sections. The end plates 31 and 32 are all drilled with matched holes so that they may be fastened together as indicated by bolts 35 and nuts 36. When the sections are connected together by the bolts 35, the bolts are under tensional strains rather than shear. The plates 31 and 32 must of course be made sufficiently thick to carry the load.

Figure 4:
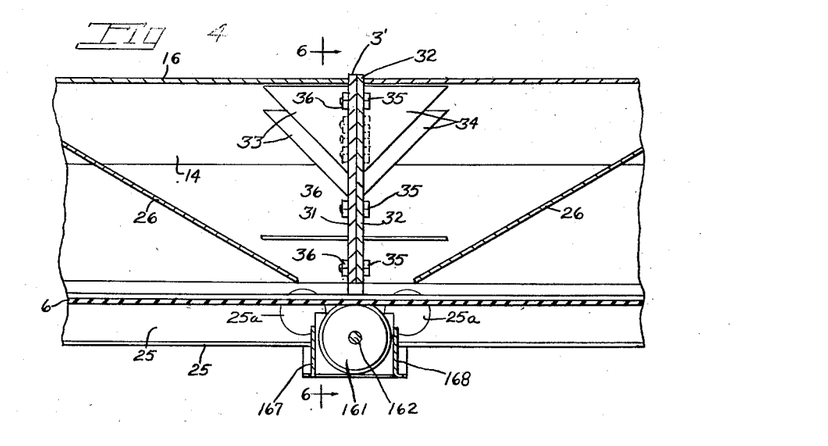
Figure 4 is an enlarged sectional view taken on the same line as Figure 3 but showing the junction between two sections of the conveyor, the upper flight of the belt being left off for the sake of clearness.
Figure 6:
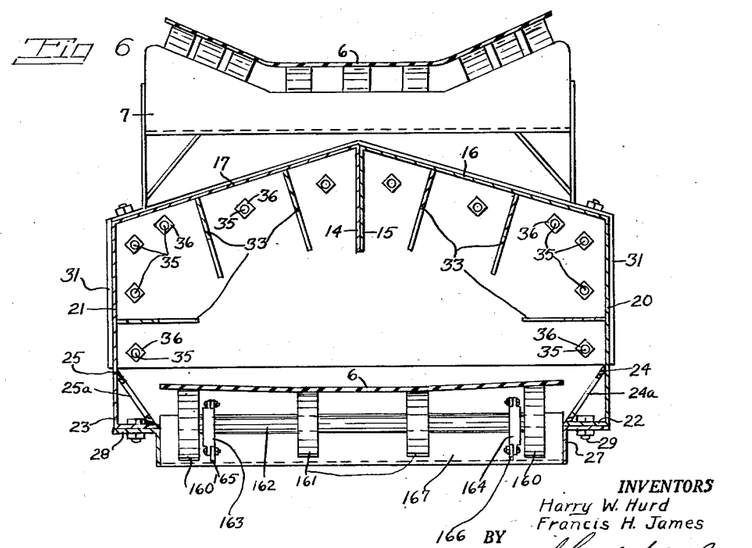
Figure 6 is a sectional view taken on the line 6—6 of Figure 4.
Figure 7:
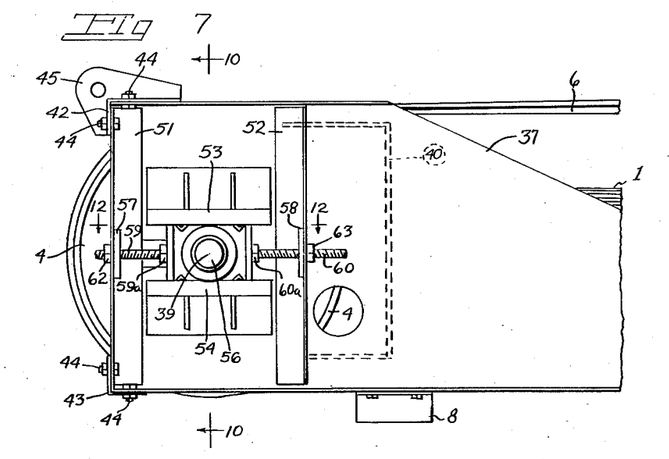
Figure 7 is an enlarged view in side elevation of one end of the conveyor, the view being taken substantially on the line 7—7 of Figure 1.

As a further means of strengthening the frame I where two sections are joined together and at the same time providing support for the lower flight of the belt 6, the roller assemblies 8 have their securing flanges 27 and 28 positioned at the junction of two sections and bolted to both sections by the bolts 29 and 30. The strips 24 and 25 have apertures 24a and 25a therein to provide access to the bolts.

Figure 8:
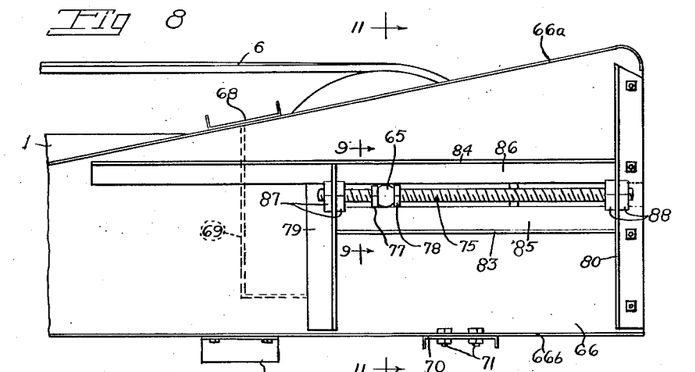
Figure 8 is an enlarged view in side elevtaion of the other end of the conveyor, the view being taken substantially on the line 8—8 of Figure 1.
Figure 9:
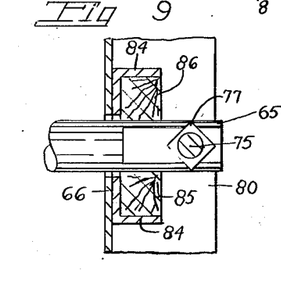
Figure 9 is an enlarged fragmentary sectional view taken on the line 9—9 of Figure 8.
Figure 10:
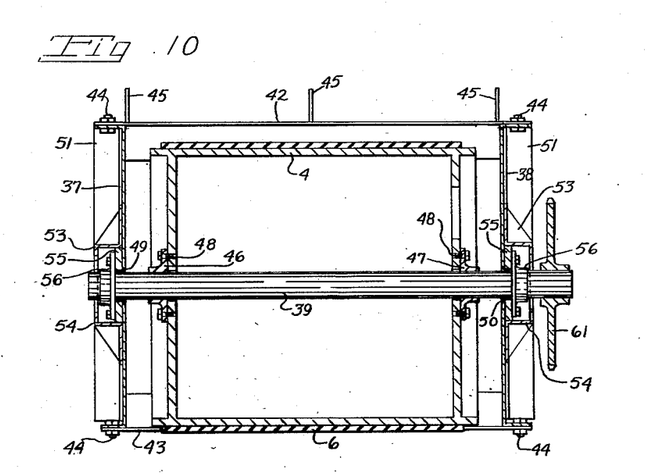
Figure 10 is a section view taken on the line 10—10 of Figure 7.

The head and tail assemblies 2 and 3 are illustrated best by Figures 1, 2 and 7–12 inclusive. It will be appreciated that either of the pulleys 4 and 5 may serve to drive the belt. The pulley 4 is mounted between two side frames 37 and 38 by a shaft 39. The side frames 37 and 38 are connected by a cross web 40 (see Figure 1), which may also be utilized to secure the assembly 2 to the frame I by bolting the end plate 32 of the frame I to the web 40 by bolts 41. The side plates 37 and 38 are further connected together by angle iron members 42 and 43 which may be removed to mount the belt 6. As shown, the side frame members 37 and 38 have outwardly turned flanges 37a and 38a to which the members 42 and 43 are bolted by bolts 44. The member 42 has a plurality of attaching members 45 thereon that are used for suspending one end of the conveyor wherever necessary. The mounting of the shaft 39 in the side frames 37 and 38 is illustrated best in Figures 7, 10 and 12. The pulley 4 is secured on the shaft in any suitable manner such as by collars 46 and 47 which are flanged and bolted to the ends of the pulley 4 by bolts 48. The shaft 39 extends through elongated slots 49 and 50 which are provided in the side frames 37 and 38. On the outside of the side frames 37 and 38 spaced vertically extending angle irons 51 and 52 are provided. The angle irons 51 are located at the outer end of the side frames 37 and 38 while the angle irons 52 are intermediate the ends of the side frames. Intermediate the angle irons 51 and 52, bearing block guides 53 and 54 are secured to each of the side frames 37 and 38. Slidable in the guides 53 and 54 is a U-shaped member 55 which is apertured to receive the shaft 39. A standard ball bearing unit 56 is bolted to the U-shaped member 55 and rotatably mounts the shaft 39. In order to adjust the shaft 39 endwise with respect to each side frame 37 and 38, we utilize the mechanism shown most clearly in Figures 7 and 12. This mechanism comprises two threaded blocks 57 and 58 which are welded to the angle irons 51 and 52 and threaded bolts 59 and 60 that are threaded through the blocks 57 and 58. The heads 59a and 60a of the bolts bear against the ends of the U-shaped member 55. By rotating the bolts 59 and 60, they may be moved endwise with respect to the blocks 57 and 58. In this way the shaft 39 can be moved endwise in the side frames 37 and 38 properly to align the pulley 4 and to take up slack in a drive chain or other connection made to a drive sprocket 61 that is shown in Figure 10 on the shaft 39. Lock nuts 62 and 63 are provided for the bolts 59 and 60.

Figure 11:
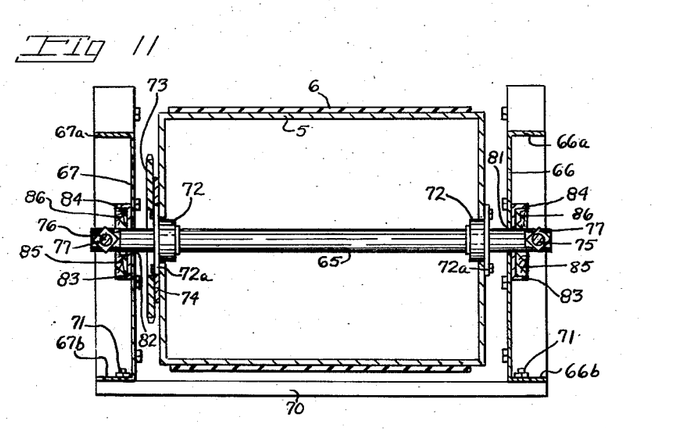
Figure 11 is a sectional view taken on the line 11—11 of Figure 8.
Figure 12:
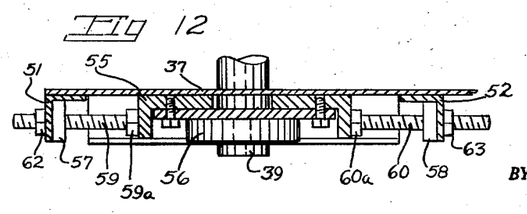
Figure 12 is an enlarged fragmentary sectional view taken on the line 12—12 of Figure 7.

The tail frame support 3 for the pulley 5 is illustrated in detail in Figures 8, 9 and 11. These figures also illustrate the way in which the pulley 5 is mounted on its drive shaft 65. The assembly 3 is composed of two side plates 66 and 67 which are flanged at the top and bottom with outwardly extending flanges indicated at 66a and 66b, and 67a and 67b. The side plates 66 and 67 are connected together at the top by a channel iron 68 which is welded to the side plates. A cross web 69 is also welded to the side plates 66 and 67 to further connect the plates and to serve as a means for securing the end plate 31 of the frame I to the side plates. A removable channel 70 is bolted to the flanges 66b and 67b by bolts 71 to connect the side plates together at the bottom. The channel 70 must be removable for replacement of the belt 6.

The shaft 65 is mounted to the side frames 66 and 67 so as to have a long adjustment lengthwise of the conveyor as will be presently described. The pulley 5 is rotatably mounted on the shaft 65 by antifriction bearings 72 which have flanges 72a that are bolted to the ends of the pulley 5. It is sometimes desirable that the drive of the belt be from the end portion 3 and the pulley 5 rather than from the pulley 4. As a means of driving the pulley 5, we provide a sprocket wheel 73 on one end of the pulley 5, using a spacing ring 74 that is suitably secured to the end of the pulley 5 and to the end of the sprocket wheel 73.

The ends of the shaft 65 are apertured to receive screw threaded adjusting members 75 and 76. These adjusting members have nuts 77 and 78 on opposite sides of the shaft and the ends of the members 75 and 76 are secured to angle irons 79 and 80 that are secured to each of the side plates 66 and 67. The side plates 66 and 67 have elongated slots 81 and 82 therein through which the shaft 65 may pass. Angle irons 83 and 84 are provided on each of the side plates below and above the slots 81 and 82 and welded in place. These angle irons form a support for blocks 85 and 86 made of metal or of hard wood and which carry the shaft 65. The ends of the members 75 and 76 are locked in place in the flanges of the angle irons 79 and 80 by nuts 87 and 88. The angle irons 80 are removably bolted to the side frames to permit insertion of the shaft 65.

Whenever it is necessary to place a new belt 6 on the conveyor, it is possible with the construction hereinbefore described to remove the old belt and apply a new belt without either cutting the belt or dismantling the conveyor. The roller assemblies 8 have to be removed and the angle irons 42 and 43 and the channel iron 70 have to be removed. The pulley 5 is then moved by adjustment of the shaft 65 to its extreme left hand position as shown in Figure 2 and the amount of slack thus gained in the belt 6 permits the belt to be passed over one of the side frames 37 and 38. In this way a belt can be put on and removed from the conveyor with very little difficulty.

Figure 13:
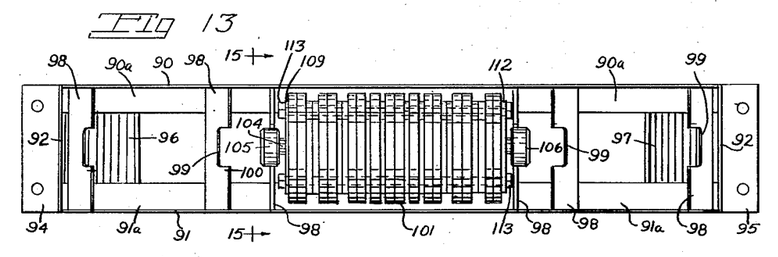
Figure 13 is a plan view with certain roller units removed of a troughing roller assembly used in the conveyor.
Figure 14:
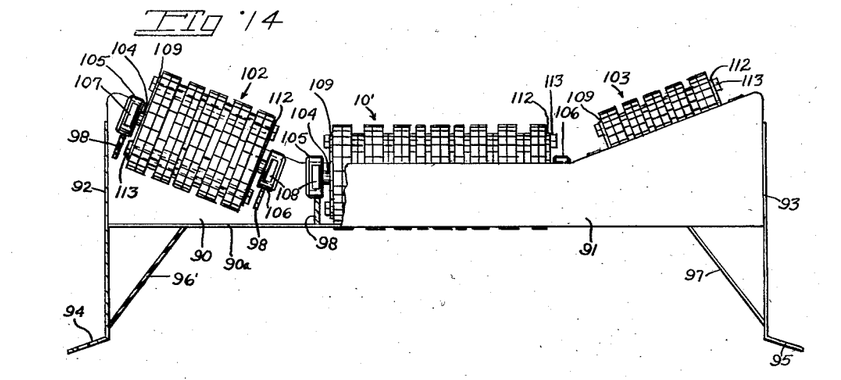
Figure 14 is a side view, partly in section, of the troughing roller assembly shown in Figure 13.
Figure 15:
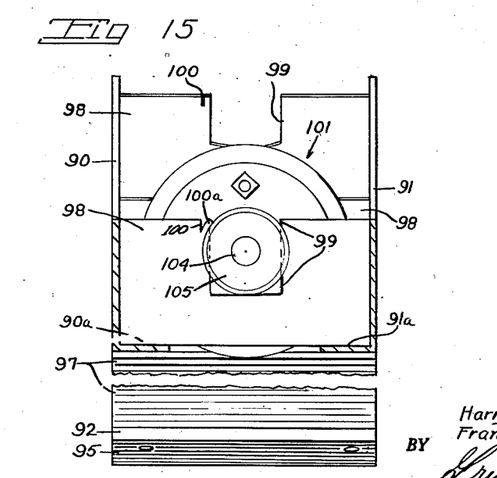
Figure 15 is an enlarged sectional view taken on the line 15—15 of Figure 13.

Referring now to Figures 13, 14 and 15, these figures illustrate the preferred form of the troughing roller assembly 7. The assembly comprises two side plates 90 and 91 which are flanged at their lower edges as indicated at 90a and 91a. The side plates are connected together at their ends by uprights 92 and 93 that have feet 94 and 95 which are bolted to the top of the frame 1. Braces 96 and 97 are employed to give rigidity to the uprights 92 and 93 and to strengthen the roller assembly. The side plates 90 and 91 are connected by a plurality of roller unit supporting across ties 98. These cross ties are all alike, each tie has a recess 99 extending downwardly from the top edge thereof and is slotted at 100 alongside the recess 9. Three roller assemblies 101, 102, and 103 are utilized to form a support for the belt 6 which will hold it in a trough shape. The roller assemblies may be constructed in various fashions. However, as shown, each one comprises a shaft 104 on the ends of which are provided two ball or roller bearing units 105 and 106. These units are grooved at the sides as indicated at 107 and 108 so that the grooves will receive the side edges of the recesses 99 provided in the cross members 98. The bearings 105 and 106 thus position a roller unit between two of the cross members 98 and rotatably mount the roller unit. The bearings are fixed in place by bending over the portion 100a of the cross plate 98 between the slot 100 and the recess 99. This construction is illustrated in detail in Figure 15 of the drawings.

Figure 16:
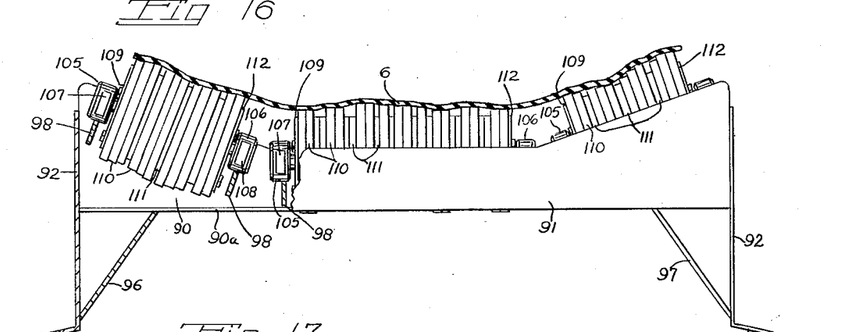
Figure 16 is a view similar to Figure 14, showing the troughing roller assembly modified to produce vibration of the belt.
Figure 17:
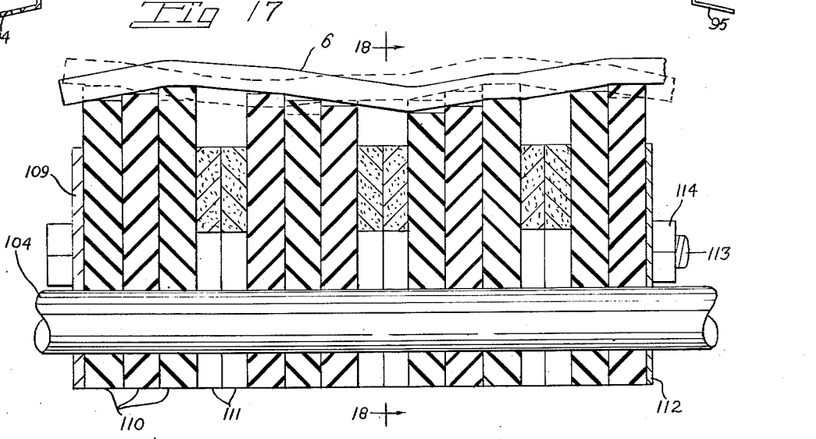
Figure 17 is an enlarged fragmentary section view taken through one of the troughing roller units shown in Figure 16, on a vertical line, the belt being shown in this figure in full lines and dotted lines with the sectioning being left out so that the different positions of the belt may be seen.
Figure 18:
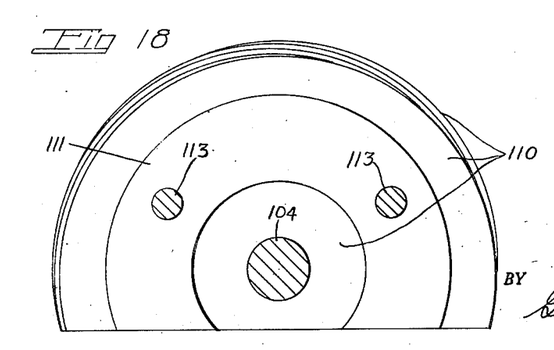
Figure 18 is a sectional view taken on the line 18—18 of Figure 17.

Each of the roller assemblies 101, 102 and 103 is preferably made up in detail as illustrated in Figures 17 and 18 of the drawings. These figures in combination with Figure 16 illustrate the way in which the rollers may be made to vibrate the belt 6. However, the roller assembly is the same in Figures 13, 14, and 15 as it is in Figures 16, 17 and 18 except for the vibration feature. Each roller unit is preferably made up of the shaft 104, a fixed plate 109 that is welded to the shaft 104, a plurality of belt receiving disks 110, spacer disks 111 and end plate 112, clamping bolts 113, passing through the plates 109 and 112 and the several disks 110 and 111 and nuts 114 for the bolts 113. Preferably the belt receiving disks 110 are constructed of rubber or a rubber belting sheet material made either of synthetic rubber or natural rubber composition. The spacer disks 111 are fibrous such as the hard tempered fiber boards sold under the trade name "Masonite." The bolts 113 are set 120 degrees apart about the shaft 104 and are spaced outwardly from the shaft so that they pass through the spacer disks 111 as well as through the disks 110. The spacers need not extend inward all the way to the shaft 104 so they have larger apertures cut in them. It is best however, to have the disks 110 apertured with an opening just the right size to receive the shaft 104. The number of disks 110, used as a unit, may vary to suit the particular type of load to which they are subjected. This pulley assembly has been found to be particularly advantageous in prolonging the life of the load carrying belts under hard usage. They are yielding to the belts and produce a minimum of slippage to wear the belts.

For certain purposes it is desirable to give the belt more motion than it normally will have in traveling over the rollers. With the improved roller assembly shown in Figures 16 to 18 inclusive, it is contemplated that the belt can be vibrated vertically as it passes over the rollers. The advantages are several. The vibration will tend to move the load inwardly over the central portion of the belt if the outer edges of the belt are vibrating. If the vibration is continued all the way across the belt, the load can be bounced on the belt so as to prevent sticking, or burning of the belt, when relatively hot material such as ashes and clinkers is being conveyed. The way in which the roller assemblies are made to vibrate the belt is by offsetting the disks 110 eccentrically with respect to the shaft 104. This is illustrated clearly by Figures 17 and 18 where the left hand disk 110 is offset horizontally with respect to the shaft 104 a certain amount. The next disk to the right is offset diagonally upward at an angle of 45 degrees from the shaft the same amount. The next disk 110 to the right is offset vertically with respect to the shaft a like amount. The next disk 110 to the right is offset upwardly at an angle of 45 degrees a like amount, but the offset in this disk is at a right angle to the offset of the second disk from the left hand end of the assembly. With the offset disks staggered this way around the shaft 104, the outline of the disks when viewed in section on the line 18—18 of Figure 17 appears as viewed in Figure 18. Figure 17 illustrates in full lines and dotted lines the changing position of the belt 6 as the shaft 104 is rotated through an angle of 90 degrees. It is evident that with this sort of arrangement the belt can be vibrated as much as desired, the rise and fall of the belt being measured by the eccentricity of the disks. Of course it is not necessary that all of the disks be offset with respect to each other. A series of disks may have the same offset.

Figure 19:
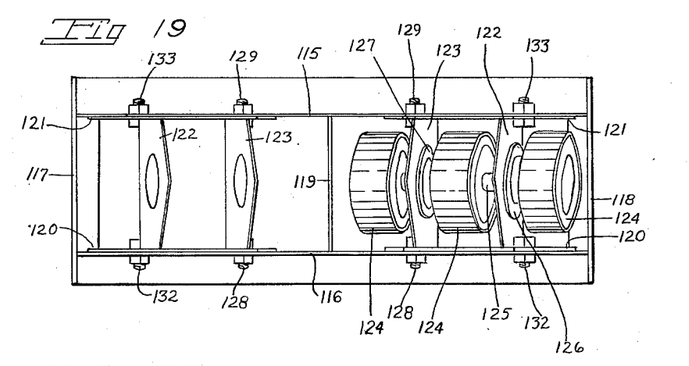
Figure 19 is a plan view of a modified form of the troughing roller assembly which provides for adjustment of the troughing of the belt.
Figure 20:
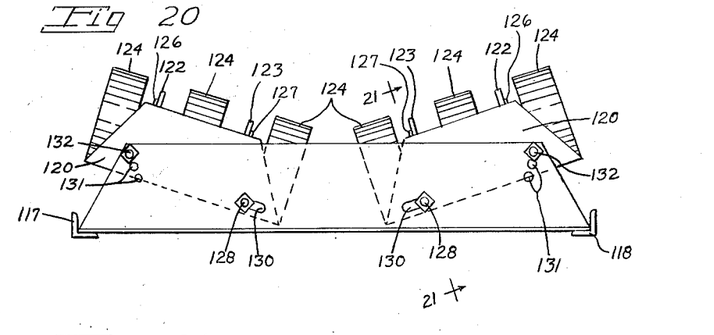
Figure 20 is a view in side elevation of the assembly shown in Figure 19.
Figure 21:
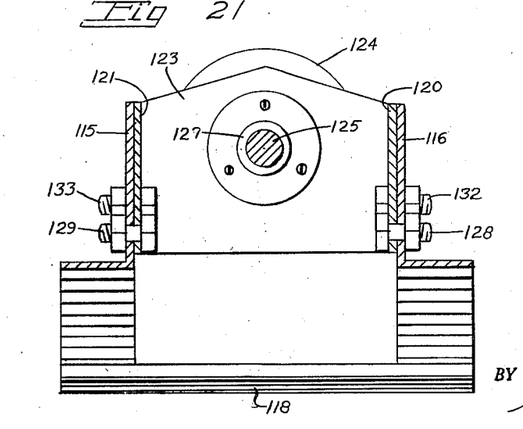
Figure 21 is a sectional view on the line 21—21 of Figure 20.

Figures 19, 20 and 21 illustrate a different form of troughing rollers that may be used where it is necessary or desirable to vary the angularity of the trough with respect to the horizontal. In this construction the troughing roller assembly is made up of two side plates 115 and 116 flanged outwardly at the bottom edges and connected together by angle irons 117 and 118 at the ends. A central web 119 connects the side plates 115 and 116. A roller assembly unit is made up of two side pieces 120 and 121 and cross pieces 122 and 123, all welded integrally together. A series of rollers 124 is fixed on a shaft 125 which is journalled by bearings 126 and 127 in the cross plates 122 and 123. This assembly just described is secured between the plates 115 and 116 by bolts 128 and 129 that are passed through round apertures at one end of the assembly and extend through elongated apertures 130 in the plates 115 and 116. A plurality of apertures 131 are provided near the outer ends of the plates 115 and 116 and bolts 132 and 133 secure the plates 120-121 to the outer ends of the plates 115 and 116. It is evident that by shifting the bolts 132 and 133 to different apertures 131, the position and angularity of the roller assemblies can be changed to suit a particular condition.

For supporting the lower flight of the belt the roller units 8 are utilized preferably with outer rollers 160 of larger diameter than the intermediate rollers 161 on the supporting shaft 162. This imparts to the lower flight of the belt a trough shape in cross section which is not so pronounced as the troughing imparted to the upper flight of the belt. However, it is sufficient to serve to center the belt on its return flight and keep it from riding toward one side or the other. The troughing action also serves to reverse the transverse bending of the belt from that which occurs in the upper flight and in this respect helps to prevent the belt from taking a permanent set due to the troughing. The shaft 162 is supported on bearing members 163 and 164 which are bolted to cross bars 165 and 166 of the assembly 8. The supporting frame of the assembly 8 comprises two plates 167 and 168 which are flanged outward at their lower edges. These plates 167 and 168 are connected together at the ends thereof by the members 27 and 28 which serve to mount the roller assembly 8 to the flanges 22 and 23 of the frame 1.

Figure 22:
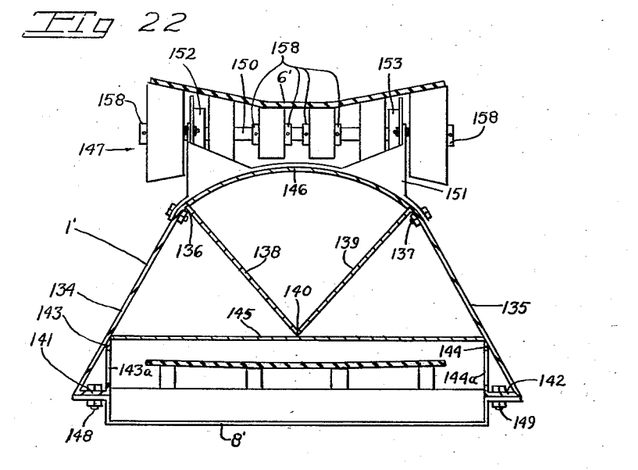
Figure 22 is a sectional view similar to Figure 5 showing a modified construction of the frame.
Figure 23:
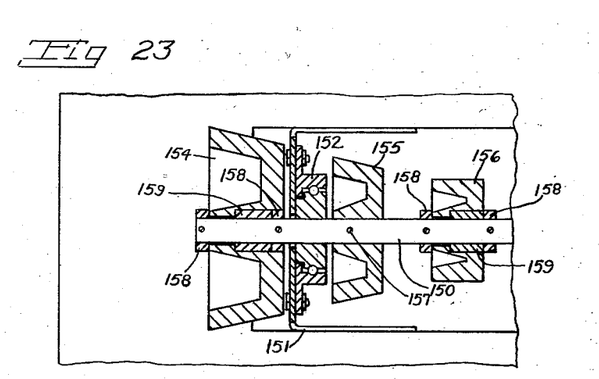
Figure 23 is an enlarged fragmentary sectional taken on the line 23—23 of Figure 22.

Referring now to Figures 22 and 23, these figures illustrate a further modification of the invention. The frame 1' shown in cross section in Figure 22 comprises two sheet metal strips 134 and 135 which are alike and which are bent at 136 and 137 to provide inverted V-shaped trusses. The short side portions 138 and 139 of the strips are secured together at 140 by welding. The main portions of the strips 134 and 135 extend outwardly and downwardly from the bends 136 and 137 and then are bent inwardly to provide horizontal flanges 141 and 142. These flanges are reenforced by vertical strips 143 and 144 that are welded to the flanges and to the main side portions of the strips. A truss plate 145 extends across the frame member at the top edges of the strips 143 and 144 and is welded to the main strips and to the lower ends of the portions 138 and 139. The convex cover strip 146 closes the space over the portions 138 and 139, being integrally joined to the strips 134 and 135 at the bends 136 and 137. The belt 6' is carried on top of the frame 1' by a roller assembly 147, the details of which are illustrated more fully in Figure 23. A roller assembly 8' like that shown in the main form of the invention is secured to the flanges 141 and 142 by bolts 148 and 149. The strips 143 and 144 are apertured as indicated at 143a and 144a to permit access to the bolts.

The roller assembly 147 utilizes a single shaft 150 which is supported on an assembly frame 151 by two bearings 152 and 153 of the anti-friction type. The construction is such that different size pulleys 154, 155 and 156 may be utilized to trough the belt 6' without requiring the belt to slip on any particular pulley. To accomplish this result without use of special bearings the pulley 155 is fixed to the shaft 150 by a key 157. Pulleys 154 and 156 are rotatably mounted on the shaft 150, using simple and inexpensive bearings and are held in place by any suitable means such as collars 158. Oil impregnated bearings 159 may be used quite economically in this construction. When the roller assembly is constructed as just described the intermediate pulley 155 when engaged by the belt will rotate the shaft 150. Since the larger pulley 154 has a greater circumference than the pulley 155, it will turn at a slightly slower rate and will therefore rotate on the shaft 150 in a backward direction. The pulley 156, being smaller than the pulley 155 will have to rotate on the shaft 150 in a forward direction, the rate of rotation however, will be very slow so that the bearings will have a longer life and will need little or no attention.

Having thus described our invention, we claim:

1. A belt conveyor adapted for transporting loose aggregates, a self supporting frame comprising a beam consisting of an inverted trough-like sheet metal member, the top wall of which slopes downwardly from the center toward both the side edges thereof, the member having in-turned flanges at its lower side edges assemblies of belt supporting rollers mounted on the top of said member in longitudinally spaced relation, operable to carry the upper loaded flight of an endless belt above and spaced from the member, assemblies of belt supporting rollers mounted on said flanges and extending across the member between the lower side edges of said member operable to support the lower return flight of said endless belt within the trough-like member above the lower side edges thereof, a pair of side frames secured to each end of said trough-like member, a pulley mounted by each pair of side frames, and an endless belt extending around the pulleys and over the roller assemblies.

2. A belt conveyor adapted for transporting loose aggregates, a self supporting frame comprising a beam consisting of an inverted trough-like sheet metal member, the top wall of which slopes downwardly from the center toward both the side edges thereof, said member having a longitudinally extending rib therein integral with and depending from said top wall, the member having in-turned flanges at its lower side edges assemblies of supporting rollers mounted on the top of said member in longitudinally spaced relation, operable to carry the upper loaded flight of an endless belt above and spaced from the member, assemblies of belt supporting rollers mounted on said flanges and extending across the member between the lower side edges of said member operable to support the lower return flight of said endless belt within the trough-like member above the lower side edges thereof, a pair of side frames secured to each end of said trough-like member, a pulley mounted by each pair of side frames, and an endless belt extending around the pulleys and over the roller assemblies.

3. A belt conveyor adapted for transporting loose aggregates, a self supporting frame comprising a beam consisting of an inverted trough-like sheet metal member, the top wall of which slopes downwardly from the center toward both the side edges thereof, the member having in-turned flanges at its lower side edges assemblies of belt supporting rollers mounted on the top of said member in longitudinally spaced relation, operable to carry the upper loaded flight of an endless belt above and spaced from the member, assemblies of belt supporting rollers mounted on said flanges and extending across the member between the lower side edges of said member operable to support the lower return flight of said endless belt within the trough-like member above the lower side edges thereof, a pair of side frames secured to each end of said trough-like member, a pulley mounted by each pair of side frames, and an endless belt extending around the pulleys and over the roller assemblies, one of said pulleys being movable in its side frames toward the other pulley a distance sufficient to enable the belt to pass over the side frames carrying the other pulley.

4. In an endless belt conveyor, a belt and load carrying sheet metal frame comprising top wall portions sloping downwardly from the center to the outer side edges of the frame, side wall portions extending downward from the outer edges of said top wall portions, inwardly extending longitudinal flanges at the lower edges of said side wall portions, a longitudinal rib depending from the upper edges of said top wall portions, and a zigzag truss plate extending lengthwise of the frame, the side edges of the truss plate being affixed to the side wall portions.

5. In an endless belt conveyor, a belt and load carrying sheet metal frame comprising top wall portions sloping downwardly from the center to the outer side edges of the frame, side wall portions extending downward from the outer edges of said top wall portions, inwardly extending longitudinal flanges at the lower edges of said side wall portions, a longitudinal rib depending from the upper edges of said top wall portions, and a zigzag truss plate extending lengthwise of the frame, the side edges of the truss plate being affixed to the side wall portions, and the rib intersecting and being affixed to the truss plate at the upper bends thereof.

6. A belt conveyor adapted for transporting loose aggregates, a self supporting frame comprising a beam consisting of an inverted trough-like sheet metal member, the top wall of which slopes downwardly from the center toward both the side edges thereof, said member having inturned flanges along the lower side edges thereof, assemblies of belt supporting rollers mounted on the top of said member in longitudinally spaced relation, operable to carry the upper loaded flight of an endless belt above and spaced from the member, assemblies of belt supporting rollers mounted on said flanges between the lower side edges of said member with the belt supporting surfaces of the rollers spaced above the flanges whereby said rollers are operable to support the lower return flight of said endless belt within the trough-like member above the flanges at the lower side edges thereof.

7. In a belt conveyor adapted for transporting loose aggregates, a self-supporting, belt supporting inverted trough-shaped frame member comprising a pair of main sheet metal strips each bent adjacent one side edge about 105 degrees to 120 degrees forming top depending flanges, said flanges being united into a central rib connecting said portions, the strips having top portions extending outwardly and downwardly from the top of said rib, and being bent downwardly at the outer edges of said top portions to form spaced apart side portions that are substantially parallel, the strip being bent inwardly at the lower edges of said side portions to form horizontal flanges, and a reenforcing strip joined to the inner edge of each horizontal flange and extending diagonally up and outward, and joined to the downwardly extending side portion of the main strip.

8. In a belt conveyor adapted for transporting loose aggregates, a self supporting, belt supporting inverted trough-shaped frame member comprising a pair of main sheet metal strips each bent adjacent one side edge about 105 degrees to 120 degrees forming top depending flanges, said flanges being united into a central rib connecting said portions, the strips having top portions extending outwardly and downwardly from the top of said rib, and being bent downwardly at the outer edges of said top portions to form spaced apart side portions that are substantially parallel, transverse, diagonally extending truss plate means affixed to said side portions and connecting them, the strip being bent inwardly at the lower edges of said side portions to form horizontal flanges, and a reenforcing strip joined to the inner edge of each horizontal flange and extending diagonally up and outward, and joined to the downwardly extending side portions of the main strip.

References Cited in the file of this patent

UNITED STATES PATENTS

| Number | Name | Date |
|---|---|---|
| 387,727 | Middleton | Aug. 14, 1888 |
| 1,352,263 | Harding | Sept. 7, 1920 |
| 1,691,681 | Thomson | Nov. 13, 1928 |
| 1,928,190 | Thomson | Sept. 26, 1933 |
| 2,386,619 | Long et al. | Oct. 9, 1945 |
| 2,430,282 | Ensinger | Nov. 4, 1947 |
| 2,588,282 | Orwin | Mar. 4, 1952 |

FOREIGN PATENTS

| Number | Country | Date |
|---|---|---|
| 423,449 | Great Britain | Feb. 1, 1935 |